United States Patent [19]

Chamberlain

[11] Patent Number: 4,514,633
[45] Date of Patent: Apr. 30, 1985

[54] IONIZATION CHAMBER FOR MEASURING THE PROFILE OF A RADIATION FIELD OF ELECTRON OR X-RAY RADIATION

[75] Inventor: Jerry E. Chamberlain, Pittsburgh, Calif.

[73] Assignee: Siemens Medical Laboratories, Inc., Walnut Creek, Calif.

[21] Appl. No.: 552,642

[22] Filed: Nov. 17, 1983

[51] Int. Cl.³ .............................................. G01T 1/18
[52] U.S. Cl. .................................................... 250/374
[58] Field of Search ....................... 250/374, 388, 375

[56] References Cited

U.S. PATENT DOCUMENTS

| | | | |
|---|---|---|---|
| 2,953,702 | 9/1960 | Zieler | 313/93 |
| 3,118,064 | 1/1964 | Attix | 250/375 |
| 3,454,770 | 7/1969 | Cialella | 250/375 |
| 3,483,377 | 12/1969 | Borkowski et al. | 250/374 |
| 3,852,610 | 12/1974 | McIntyre | |
| 3,911,280 | 10/1975 | Hyman et al. | 250/395 |
| 3,937,966 | 2/1976 | Godel et al. | 250/393 |
| 3,942,012 | 3/1976 | Boux | |
| 3,997,788 | 12/1976 | Boux | |
| 4,047,040 | 9/1977 | Houston | |
| 4,131,799 | 12/1978 | Stieber | |
| 4,264,816 | 4/1981 | Walenta | 250/374 |

FOREIGN PATENT DOCUMENTS 1408292 10/1975 United Kingdom .

| | | | |
|---|---|---|---|
| 479417 | 7/1972 | U.S.S.R. | 250/374 |
| 502846 | 4/1976 | U.S.S.R. | 250/374 |
| 743558 | 1/1979 | U.S.S.R. | 250/374 |

OTHER PUBLICATIONS

Article "A Simple, Nondestructive Profile Monitor for External Proton Beams" by F. Hornstra and J. R. Simanton in Nuclear Instruments and Methods 68 (1969) pp. 138-140; North-Holland Publishing Co.
Medical Physics, vol. 7, No. 2, Mar./Apr. 1980, New York, by D. J. Keys, "Thin-Walled Parallel Plate Ionization Chamber for use with Photon and Electron Beam Dosimetry", pp. 163-164.

Primary Examiner—Alfred E. Smith
Assistant Examiner—Richard Hanig
Attorney, Agent, or Firm—Mark H. Jay

[57] ABSTRACT

An ionization chamber for measuring the profile of a radiation field is provided which comprises a first electrode and a second electrode arranged parallel to said first electrode, both electrodes forming a gap therebetween. A shield made of a material opaque to ions produced by the radiation field is movably arranged in said gap between said electrodes and has an aperture, which between said electrodes forms a measuring volume. The ionization chamber further comprises means for moving said shield together with said aperture along said gap between said electrodes.

12 Claims, 5 Drawing Figures

IONIZATION CHAMBER FOR MEASURING THE PROFILE OF A RADIATION FIELD OF ELECTRON OR X-RAY RADIATION

BACKGROUND OF THE INVENTION

1. Field of the Invention

The present invention relates to an ionization chamber for measuring the profile of a radiation field. In particular, this invention relates to an ionization chamber for electrons or X-rays, preferably for use in or in conjunction with a linear accelerator.

2. Description of the Prior Art

Ionization chambers for analyzing inhomogeneities in a radiation field are in general well known in the prior art (e.g. U.S. Pat. Nos. 4,131,799, 3,942,012, 3,997,788, 3,852,610 or 4,407,040). However, all these ionization chambers do not allow to measure the profile of the radiation field.

A proton profile measuring device is described in the article "A Simple, Nondestructive Profile Monitor For External Proton Beams" by F. Hornstra and J. R. Simanton in Nuclear Instruments and Methods 68 (1969) 138–140; North-Holland Publishing Co. This device comprises a net of wires as profile indictor. However, a net of wires is not exact enough for profile measurements.

SUMMARY OF THE INVENTION

1. Objects

It is an object of this invention to provide an improved ionization chamber which allows for measuring the profile of a radiation field with high accuracy.

It is another object of the invention to provide such an improved ionization chamber which is portable and which can be an accessory for a linear accelerator.

It is still another object of the invention to provide such an improved ionization chamber which allows for central depths dose measurements without using water.

2. Summary

According to this invention an ionization chamber for measuring the profile of a radiation field is provided, which comprises:

(a) a first electrode;

(b) a second electrode arranged parallel to said first electrode, both electrodes forming a gap therebetween;

(c) a shield made of a material opaque to ions produced by the radiation field, said shield being movably arranged in said gap between said electrodes and having an aperture, said aperture between said electrodes forming a measuring volume and (d) means for moving said shield together with said aperture along said gap between said electrodes.

The aperture can be made very small. Thus, an ionization chamber has been created with a very small measuring volume, which can be moved along the gap between the electrodes. The very small and movable measuring volume allows for measuring the profile of a radiation field with highest accuracy.

The invention can be used in a horizontal embodiment as portable version for field measurements of intensity distribution across a radiation field. Also, a vertical embodiment of the invention may be directly attached to a linear accelerator for measuring its central axis depth dose.

DETAILED DESCRIPTION OF THE PREFERRED EMBODIMENT

Figure 1:
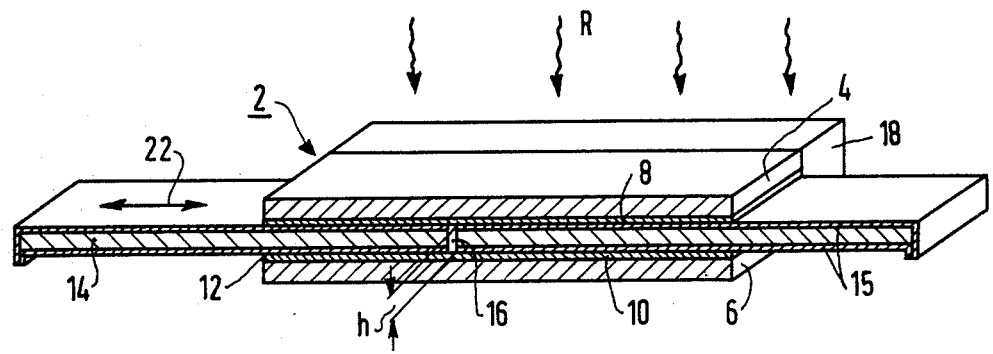
FIG. 1 is a horizontal embodiment of the invention partially cutted.
Figure 2:
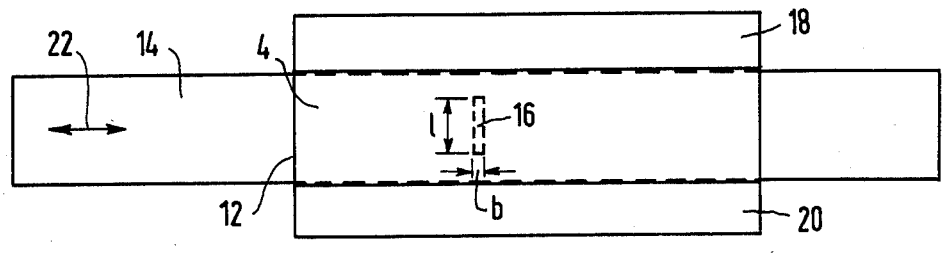
FIG. 2 is a top view of the horizontal embodiment.

In FIGS. 1 to 4 the ionization chamber 2 comprises two flat plates 4 and 6 (e.g. of Lucite) having a first metallic (high voltage) electrode 8 and a second metallic (collecting) electrode 10. The plates together with the electrodes are arranged parallel to each other, such that they form a gap 12 therebetween. In this gap a shield 14 made of a material which is opaque to ions produced by a radiation field R (e.g. conducting material such as copper) and which is coated with an insulation material 15 (e.g. Lucite), is movably positioned. The shield 14 comprises a narrow air aperture (for example h=5–8 mm; b=2–3 mm; l=5–10 mm) which forms a measuring volume between the electrodes 8 and 10. The open side areas of the gap 12 are covered by side walls 18 and 20 (e.g. of Lucite).

Figure 3:
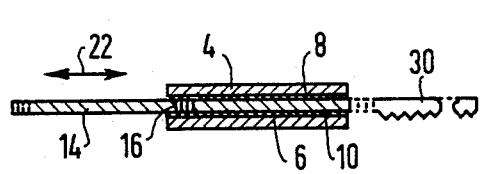
FIG. 3 and FIG. 4 show two end positions of the aperture.

The shield 14, which is at least twice the length of the plates 4 and 6 with electrodes 8 and 10 is slidable in the gap 12 between the electrodes 8 and 10 in the directions of the double arrow 22. Under these circumstances the aperture 16, which extends perpendicular to the moving direction of the shield can be moved between a first position at the left side and a second position at the right side of the plates and electrodes. The first position is shown in FIG. 3 and the second position in indicated in FIG. 4. A motor drive 24 (motor 26, rack wheel 28 and rack 30) for moving the shield 14 is indicated in FIG. 6.

When moving the aperture 16 between the two aforementioned positions (also indicated by dotted lines in FIG. 3) the profile of the radiation field R as depicted in FIG. 1 can be measured with high accuracy.

Figure 4:
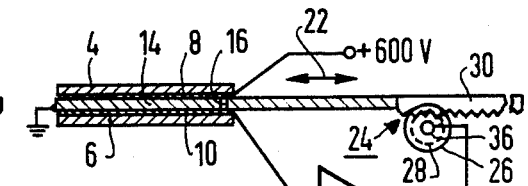

For this purpose as indicated in FIG. 4, the electrode 8 is supplied with +600 V. The electrode 10 is connected via amplifier circuit 32 (ionization current amplifiers, integrators, etc., which are standard parts of a linear accelerator dose monitoring device) with the Y-input of a display unit 34 (e.g. plotter). The X-input of the display unit 34 is connected with a potentiometer 36 which is driven by motor 26 of the motor drive 24. The shield 14 itself is grounded. It completely blocks the electrostatic field between the first (high-voltage) electrode 8 and the second (collecting) electrode 10 except at the location were the air aperture is cut in the shield. During this aperture ions produced by the radiation field R can flow to the collecting electrode 10, thereby generating a signal at this electrode which is a measure for the energy of the radiation field at the location of the aperture 16.

The effective chamber volume of the ionization chamber and hence the sensitivity is determined by the product of aperture height l, width b and electrode separation h. The dimensions l and h may be optimized for chamber sensitivity while only dimension b effects the degree of resolution.

The ionization chamber may be directly attached to the source of radiation, e.g. a linear accelerator (not shown).

Figure 5:
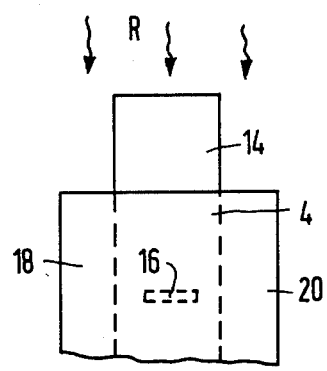
FIG. 5 is a vertical embodiment of the invention.

The horizontal embodiment of FIG. 1 can also be used in a vertical position as shown in FIG. 5. In this case the central axis depth dose of a linear accelerator can be measured without using water.

In the embodiments of FIGS. 1 to 5 the electrodes 8, 10 can, for example be made of copper for $e^-$ profile measurements. The electrodes can also be made of copper (or any other suitable conductive material) for X-ray profile measurements.

While the forms of the ionization chamber herein described constitute preferred embodiments of the invention, it is to be understood that the invention is not limited to these precise forms of assembly, and that a variety of changes may be made therein without departing from the scope of the invention.

What is claimed is:

1. An ionization chamber for measuring the profile of a radiation field, comprising:
   (a) a first electrode;
   (b) a second electrode arranged parallel to said first electrode, both electrodes forming a gap therebetween;
   (c) a shield made of a material opaque to ions produced by the radiation field, said shield being movably arranged in said gap between said electrodes and having an aperture, said aperture between said electrodes forming a measuring volume; and
   (d) means for moving said shield together with said aperture along said gap between said electrodes.

2. An ionization chamber according to claim 1, wherein said first and second electrodes are attached to respective first and second plates.

3. An ionization chamber according to claim 2, wherein said plates are made of Lucite.

4. An ionization chamber according to claim 1, wherein said aperture is an elongated slot which extends perpendicularly to the moving direction of said shield.

5. An ionization chamber according to claim 1, wherein said shield is made of an electrically conducting material having a coat of isolation material.

6. An ionization chamber according to claim 5, wherein said conducting material is copper.

7. An ionization chamber according to claim 5, wherein said shield is electrically grounded.

8. An ionization chamber according to claim 5, wherein said coat is made of Lucite.

9. An ionization chamber according to claim 1, wherein said moving means comprise a motor.

10. An ionization chamber according to claim 1, wherein the length of the shield is at least twice the length of said electrodes.

11. An ionization chamber according to claim 1, wherein said electrodes are made of copper for $e^-$ profile measurements.

12. An ionization chamber according to claim 1, wherein said electrodes are made of copper for X-ray profile measurements.

* * * * *